US010256468B2

(12) United States Patent
Idemoto et al.

(10) Patent No.: US 10,256,468 B2
(45) Date of Patent: Apr. 9, 2019

(54) POSITIVE ELECTRODE ACTIVE MATERIAL FOR MAGNESIUM SECONDARY BATTERY, POSITIVE ELECTRODE FOR MAGNESIUM SECONDARY BATTERY, AND MAGNESIUM SECONDARY BATTERY

(71) Applicant: TOKYO UNIVERSITY OF SCIENCE FOUNDATION, Shinjuku-ku (JP)

(72) Inventors: Yasushi Idemoto, Tokyo (JP); Naoto Kitamura, Tokyo (JP); Naoya Ishida, Tokyo (JP)

(73) Assignee: Tokyo University of Science Foundation, Tokyo (JP)

( * ) Notice: Subject to any disclaimer, the term of this patent is extended or adjusted under 35 U.S.C. 154(b) by 0 days.

(21) Appl. No.: 15/580,494

(22) PCT Filed: Jun. 6, 2016

(86) PCT No.: PCT/JP2016/066795
§ 371 (c)(1),
(2) Date: Dec. 7, 2017

(87) PCT Pub. No.: WO2016/199732
PCT Pub. Date: Dec. 15, 2016

(65) Prior Publication Data
US 2018/0183058 A1    Jun. 28, 2018

(30) Foreign Application Priority Data

Jun. 10, 2015 (JP) ................................ 2015-117810

(51) Int. Cl.
*H01M 4/02* (2006.01)
*H01M 4/525* (2010.01)
(Continued)

(52) U.S. Cl.
CPC ............ *H01M 4/525* (2013.01); *C01G 53/66* (2013.01); *H01M 4/505* (2013.01);
(Continued)

(58) Field of Classification Search
CPC ...................................................... H01M 4/02
See application file for complete search history.

(56) References Cited

U.S. PATENT DOCUMENTS

2014/0127594 A1* 5/2014 Nakayama ............ G01N 27/26
429/403

FOREIGN PATENT DOCUMENTS

| JP | 2001-76720 | 3/2001 |
| JP | 2002-25555 | 1/2002 |

(Continued)

OTHER PUBLICATIONS

Yagi et al., "Synthesis of Binary Magnesium-Transition Metal Oxides via Inverse Coprecipitation", Japanese Journal of Applied Physics 52, 2013, 6 pages.
(Continued)

*Primary Examiner* — Jacob B Marks
(74) *Attorney, Agent, or Firm* — SOLARIS Intellectual Property Group, PLLC

(57) ABSTRACT

A positive electrode active material for a magnesium secondary battery, and a positive electrode for a magnesium secondary battery and a magnesium secondary battery in which the positive electrode active material is used are provided. The positive electrode active material consists of a magnesium composite oxide which is represented by Formula (1): $Mg_xM1_yM2_zO_2$ and which has a rock salt-type crystal structure of space group Fm-3m. In Formula (1), M1 is Ni, Co, or Mn, M2 is different from M1 and is at least one
(Continued)

element selected from the group consisting of Ni, Co, Mn, Ti, V, Cr, Fe, Cu, Nb, W, Mo, and Ru, $0<x\leq1$, $0<y<2$, $0<z<1$; and $1.5\leq x+y+z\leq2.0$.

12 Claims, 2 Drawing Sheets

(51) Int. Cl.
- *H01M 4/505* (2010.01)
- *H01M 10/054* (2010.01)
- *H01M 10/0566* (2010.01)
- *C01G 53/00* (2006.01)
- *H01M 10/0569* (2010.01)

(52) U.S. Cl.
CPC ..... *H01M 10/054* (2013.01); *H01M 10/0566* (2013.01); *H01M 10/0569* (2013.01); *C01P 2006/40* (2013.01); *H01M 2004/028* (2013.01); *H01M 2300/0028* (2013.01)

(56) References Cited

FOREIGN PATENT DOCUMENTS

| | | |
|---|---|---|
| JP | 2014-7155 | 1/2014 |
| JP | 2015-92473 | 5/2015 |

OTHER PUBLICATIONS

Ichitsubo et al, "Potential Positive Electrodes for High-Voltage Magnesium-ion Batteries", J. Mater. Chem., 21, 2011, pp. 11764-11772.

Yuping et al., "Development of Mg-Transition Metal Complex as Cathode Materials", Progress in Chemistry, vol. 26, Issue 9, 2014, pp. 1596-1608.

Huie et al., "Cathode Materials for Magnesium and Magnesium-ion Based Batteries", Coordination Chemistry Reviews, vol. 287, Mar. 15, 2015, pp. 15- 27.

Search Report and Written Opinion in International Application No. PCT/JP2016/066795 dated Sep. 6, 2016, 7 pages.

\* cited by examiner

POSITIVE ELECTRODE ACTIVE MATERIAL FOR MAGNESIUM SECONDARY BATTERY, POSITIVE ELECTRODE FOR MAGNESIUM SECONDARY BATTERY, AND MAGNESIUM SECONDARY BATTERY

TECHNICAL FIELD

The present disclosure relates to a positive electrode active material for a magnesium secondary battery, a positive electrode for a magnesium secondary battery, and a magnesium secondary battery.

BACKGROUND ART

In recent years, the applications of storage batteries have been diversified to include mobile devices, automobiles, stationary power sources, and the like. Therefore, the development of next-generation secondary batteries which are inexpensive and have high energy densities has been expected as alternatives to conventional lithium ion secondary batteries. Among next-generation secondary batteries, magnesium secondary batteries are particularly advantageous in many aspects including the following: (i) high capacity can be expected because the two-electron reaction can be used for charging and discharging; (ii) magnesium that can be used for a negative electrode is excellent in safety and has a relatively low potential, thereby allowing high voltage operation of batteries; and (iii) magnesium is inexpensive with fewer risks of maldistribution of production areas. Therefore, the research and development of magnesium secondary batteries are in progress.

At the beginning of the development, $TiS_2$, $ZrS_2$, $RuO_2$, $Co_3O_4$, $V_2O_5$, or the like was used as a positive electrode active material for a magnesium secondary battery. In recent years, magnesium composite oxides having various crystal structures have been proposed.

For example, Ichitsubo et al. discloses $Mg_{0.67}Ni_{1.33}O_2$ having a rock salt-type structure as a positive electrode active material for a magnesium secondary battery (Tetsu Ichitsubo, et al., Journal of Materials Chemistry, 21, 11764 (2011)).

In addition, Yagi et al. discloses a method of synthesizing MgNiO2 having a rock salt-type structure (Shunsuke Yagi, et al., Japanese Journal of Applied Physics, 52, 025501 (2013)).

SUMMARY OF INVENTION

Problems to be Solved by the Invention

Meanwhile, studies made by the inventor of the present invention suggest that in a case in which magnesium composite oxides such as those disclosed in Ichitsubo et al. and Yagi et al. are used as a positive electrode active material for a magnesium secondary battery, discharge capacity is small, making it difficult to obtain a magnesium secondary battery having favorable charge-discharge characteristics.

In view of the above, an object of this disclosure is to provide a positive electrode active material for a magnesium secondary battery, whereby a magnesium secondary battery having favorable charge-discharge characteristics can be obtained, and a positive electrode for a magnesium secondary battery and a magnesium secondary battery, in which the positive electrode active material is used.

Solution to Problem

Specific means for solving the object described above include the following embodiments.

<1> A positive electrode active material for a magnesium secondary battery, the positive electrode active material consisting of a magnesium composite oxide that is represented by the following Formula (1) and that has a rock salt-type crystal structure of space group Fm-3m:

$$Mg_xM1_yM2_zO_2 \quad (1)$$

wherein, in Formula (1), M1 is Ni, Co, or Mn;
M2 is different from M1 and is at least one element selected from the group consisting of Ni, Co, Mn, Ti, V, Cr, Fe, Cu, Nb, W, Mo, and Ru;
$0<x\leq1$;
$0<y<2$;
$0<z<1$; and
$1.5\leq x+y+z\leq2.0$.

<2> The positive electrode active material for a magnesium secondary battery according to <1>, wherein M1 in Formula (1) is Ni.

<3> The positive electrode active material for a magnesium secondary battery according to <1> or <2>, wherein M2 in Formula (1) is at least one element selected from the group consisting of Ni, Co, Mn, Ti, V, Cr, Fe, and Cu.

<4> The positive electrode active material for a magnesium secondary battery according to any one of <1> to <3>, wherein $0<x\leq0.8$, $0.5\leq y<2$, $0<z\leq0.6$, and $1.5\leq x+y+z\leq2.0$.

<5> A positive electrode for a magnesium secondary battery, the positive electrode comprising the positive electrode active material for a magnesium secondary battery according to any one of <1> to <4>.

<6> A magnesium secondary battery, comprising:
the positive electrode for a magnesium secondary battery according to <5>;
a negative electrode; and
a non-aqueous electrolyte solution.

Effect of Invention

According to the invention, a positive electrode active material for a magnesium secondary battery, whereby a magnesium secondary battery having favorable charge-discharge characteristics, and a positive electrode for a magnesium secondary battery and a magnesium secondary battery, in which the positive electrode active material is used can be provided.

DESCRIPTION OF EMBODIMENTS

Figure 1:
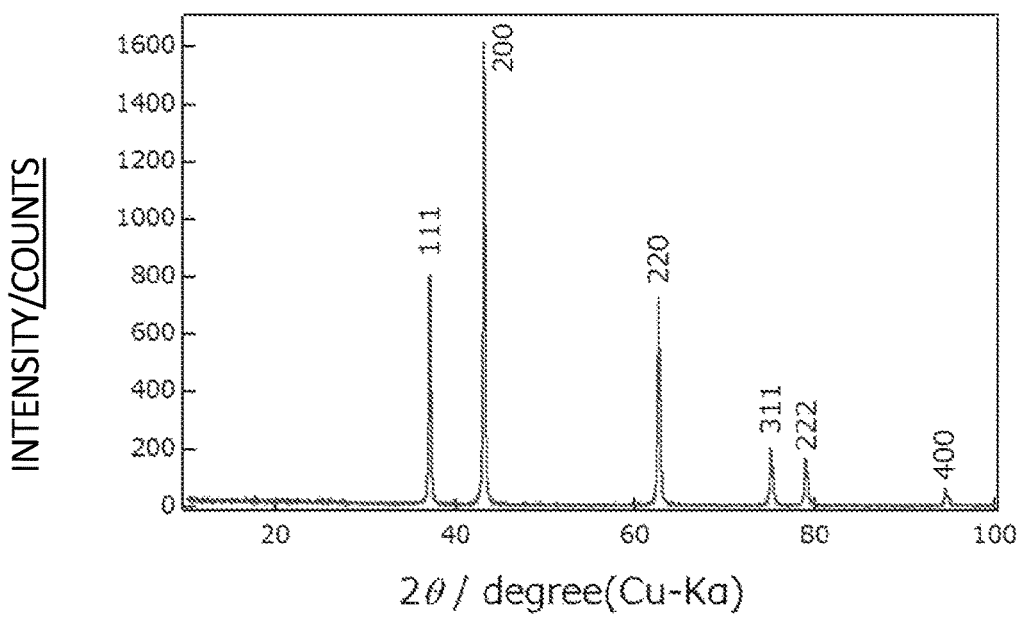
FIG. 1 is a drawing showing the powder X-ray diffraction pattern of the magnesium composite oxide obtained in Synthesis Example 1.

One exemplary embodiment, in which the invention is applied to a positive electrode active material for a magnesium secondary battery, a positive electrode for a magnesium secondary battery, and a magnesium secondary battery, is described in detail below. Note that the invention is not limited to the following embodiment.

The term "layer" used herein encompasses a structure of a shape formed over the entire face and a structure of a shape formed on a partial face when viewed in a plan view. In addition, a numerical range expressed using the expression "from . . . to . . . " refers to a range that includes the number written before "to" and the number written after "to" as a minimum value and a maximum value, respectively.

<Positive Electrode Active Material for Magnesium Secondary Battery>

A positive electrode active material for a magnesium secondary battery (hereinafter simply referred to as a "positive electrode active material") in this embodiment consists of a magnesium composite oxide which is represented by the following Formula (1) and which has a rock salt-type crystal structure of space group Fm-3m. It is possible to obtain a magnesium secondary battery having favorable charge-discharge characteristics by composing a magnesium secondary battery using the positive electrode active material.

$$Mg_xM1_yM2_zO_2 \tag{1}$$

In Formula (1), the element M1 is Ni, Co, or Mn. In view of energy density, the element M1 is preferably Ni.

In Formula (1), the element M2 differs from the element M1 and is at least one element selected from the group consisting of Ni, Co, Mn, Ti, V, Cr, Fe, Cu, Nb, W, Mo, and Ru. In view of charge/discharge capacity per unit mass of the positive electrode active material, the element M2 is preferably at least one element selected from the group consisting of Ni, Co, Mn, Ti, V, Cr, Fe, and Cu, and more preferably at least one element selected from the group consisting of Ni, Co, Mn, V, Fe, and Cu.

A number of kinds of the element M2 is not particularly limited. In view of synthesis process, the number of kinds of the element M2 is from 1 to 3, and more preferably 1 or 2.

In one embodiment, the element M1 is Ni and the element M2 is Co in Formula (1).

In Formula (1), x denotes the abundance of Mg in the magnesium composite oxide and $0<x\leq1$. In a case in which the magnesium composite oxide serves as a positive electrode active material for a magnesium secondary battery, the value of x varies depending on the charging/discharging state. Since metal magnesium, a magnesium alloy, or the like is used for a negative electrode, $0<x\leq0.8$ is preferable and $0<x\leq0.5$ is more preferable.

In Formula (1), y represents the abundance of the element M1 in the magnesium composite oxide and $0<y<2$. In view of charge/discharge capacity, $0.5\leq y<2$ is preferable and $1\leq y<2$ is more preferable.

In Formula (1), z denotes the abundance of the element M2 in the magnesium composite oxide and $0<z<1$. In a case in which the element M2 includes two or more kinds of elements, the ratio among the elements is not particularly limited. In view of charge/discharge capacity, $0<z\leq0.6$ is preferable.

In Formula (1), x+y+z satisfies $1.5\leq x+y+z\leq2.0$.

In Formula (1), it is preferable that x, y, and z satisfy $0<x\leq0.8$, $0.5\leq y<2$, $0<z\leq0.6$, and $1.5\leq x+y+z\leq2.0$.

A method of synthesizing the magnesium composite oxide represented by Formula (1) is not particularly limited and a publicly known method such as the reverse coprecipitation method, the solid phase method, or the hydrothermal method can be adopted, if appropriate. Of these synthesis methods, the reverse coprecipitation method is preferable because a homogenous phase can be easily obtained thereby.

One example of the method of synthesizing the magnesium composite oxide represented by Formula (1) by coprecipitation is as described below.

First, an aqueous solution containing a magnesium compound, a compound containing the element M1, a compound containing the element M2, and a precipitant is prepared.

Examples of the magnesium compound, the compound containing the element M1, or the compound containing an element M2 include a water-soluble compound containing magnesium, the element M1, or the element M2. Examples of the water-soluble compound include a nitrate, a carbonate, an acetate, an oxalate, a phosphate, a sulfate, a hydroxide, and a halide (such as a fluoride, a chloride, a bromide, or an iodide). These water-soluble compounds may be hydrates. In addition, these water-soluble compounds may be used singly, or in combination of two or more kinds thereof.

Examples of the precipitant include sodium carbonate and sodium hydroxide. Such precipitants may be used singly, or in combination of two or more kinds thereof.

A mixing ratio of the magnesium compound, the compound containing the element M1, and the compound containing the element M2 in the aqueous solution may be determined as a mixing ratio based on values of x, y, and z in Formula (1).

Next, the aqueous solution is stirred at from 50° C. to 90° C. for from 30 minutes to 120 minutes, thereby causing a precipitate to be formed.

Subsequently, the precipitate is washed and dried, thereby obtaining a precursor.

Then, the precursor is subjected to calcination at from 550° C. to 950° C. for from 12 hours to 48 hours. Thus, the magnesium composite oxide represented by Formula (1) can be obtained.

<Positive Electrode for Magnesium Secondary Battery>

The positive electrode for a magnesium secondary battery (hereinafter simply referred to as "positive electrode") of this embodiment contains the above-described positive electrode active material. The positive electrode can be produced by forming a positive electrode mixture containing the positive electrode active material into a film and pressure-bonding the film to a positive electrode current collector. Alternatively, the positive electrode can be produced by applying a paste, which is prepared by adding an organic solvent to the positive electrode mixture, to a positive electrode current collector, drying the paste to form a positive electrode mixture layer, and if necessary, further performing rolling.

The positive electrode current collector is not particularly limited and any known positive electrode current collector can be used. Examples of the positive electrode current collector include foil or mesh which is formed with aluminum, stainless steel, copper, or the like.

The positive electrode mixture can be prepared by mixing the positive electrode active material, and if necessary, a binder, a conductive auxiliary agent, and the like. The binder and the conductive auxiliary agent are not particularly limited and materials known for the binder and the conductive auxiliary agent may be respectively used.

Examples of the binder include polytetrafluoroethylene, polyvinylidene fluoride, polyimide, polyvinyl acetate, nitrocellulose, styrene-butadiene rubber, and acrylonitrile rubber. Such binders may be used singly, or in combination of two or more kinds thereof.

Examples of the conductive auxiliary agent include carbon black, graphite, carbon fibers, and metal fibers. Examples of the carbon black include acetylene black, Ketjen black, channel black, furnace black, lamp black, and thermal black. Such conductive auxiliary agents may be used singly, or in combination of two or more kinds thereof.

In a case in which an organic solvent is added to the positive electrode mixture for paste preparation, the organic solvent is not particularly limited and materials known therefor may be used. Examples of the organic solvent include N-methyl-2-pyrrolidone, tetrahydrofuran, and N,N-dimethyl formamide. Such organic solvents may be used singly, or in combination of two or more kinds thereof. It is preferable to determine an amount of the paste applied to the positive electrode current collector depending on an intended use of the magnesium secondary battery or the like, if appropriate.

<Magnesium Secondary Battery>

The magnesium secondary battery of this embodiment includes the positive electrode, a negative electrode, and a non-aqueous electrolyte solution described above. A separator is disposed between the positive electrode and the negative electrode. As the positive electrode is already described above, the components other than the positive electrode are described in detail below.

(Negative Electrode)

The negative electrode contains a negative electrode active material capable of storing and releasing magnesium ions.

Examples of the negative electrode active material include metal magnesium and a magnesium alloy. Examples of the magnesium alloy include Mg—Al alloy, Mg—Zn alloy, Mg—Mn alloy, Mg—Ni alloy, Mg—Sb alloy, Mg—Sn alloy, and Mg—In alloy.

It is also possible to use, as the negative electrode active material, a material such as aluminum, zinc, lithium, silicon, or tin, which forms an alloy with magnesium. Further, it is also possible to use, as the negative electrode active material, a carbon material such as graphite or amorphous carbon capable of electrochemically storing and releasing magnesium ions.

The negative electrode can be prepared by shaping the negative electrode active material such as metal magnesium or a magnesium alloy into a shape adequate for an electrode (e.g., a plate shape).

It is also possible to prepare a negative electrode by applying a negative electrode mixture paste containing the negative electrode active material to a negative electrode current collector, drying the paste to form a negative electrode mixture layer, and if necessary, further performing rolling. The negative electrode current collector is not particularly limited and a known negative electrode current collector can be used. Examples of the negative electrode current collector include foil or mesh, which is formed with aluminum, stainless steel, copper, or the like.

The negative electrode mixture paste can be prepared by adding a negative electrode active material, and if necessary, a binder, a conductive auxiliary agent, and the like, to an organic solvent, followed by mixing. As the binder, the conductive auxiliary agent, and the organic solvent, materials used for the positive electrode can be similarly used.

(Separator)

The separator is provided such that it is disposed between a positive electrode and a negative electrode so as to insulate the positive electrode and the negative electrode. Such separator is not particularly limited and a known separator can be used. Examples of materials for the separator include glass, ceramics, polyethylene, polypropylene, polyamide, polyimide, and polytetrafluoroethylene. A shape of the separator can be a porous body or the like.

(Non-Aqueous Electrolyte Solution)

The non-aqueous electrolyte solution contains a non-aqueous solvent and a supporting salt as a solute. The non-aqueous solvent and the supporting salt are not particularly limited and materials known for a non-aqueous solvent and a supporting salt may be respectively used.

Examples of the non-aqueous solvent include acetonitrile, ethylene carbonate, propylene carbonate, butylene carbonate, vinylene carbonate, dimethyl carbonate, diethyl carbonate, dipropyl carbonate, γ-butyrolactone, sulfolane, 1,2-dimethoxyethane, 1,2-diethoxyethane, tetrahydrofuran, 2-methyltetrahydrofuran, 3-methyl-1,3-dioxolane, methyl propionate, methyl butyrate, and an ion liquid.

Examples of the supporting salt include $Mg(N(SO_2CF_3)_2)_2$, $Mg(SO_3CF_3)_2$, $Mg(ClO_4)_2$, $MgBr_2$, $Mg(BF_4)_2$, and $Mg(PF_6)_2$.

(Shape and the Like of Magnesium Secondary Battery)

A shape of the magnesium secondary battery is not particularly limited and it may be any of a coin shape, a cylindrical shape, or a layered shape. Further, an electrical connection form (electrode structure) in the magnesium secondary battery may be either a non-bipolar type (internal parallel connection type) or a bipolar type (internal serial connection type).

EXAMPLES

The invention is specifically described with reference to the Examples as below. However, the invention is not limited to the Examples.

Synthesis Example 1

1.48 g of sodium carbonate was dissolved in 200 mL of secondary distilled water, and the resulting aqueous solution was heated to 80° C. A solution prepared by diluting 8.00 mL of a 1.0 mol/L magnesium nitrate aqueous solution, 6.40 mL of a 1.0 mol/L nickel nitrate aqueous solution, and 1.60 mL of a 1.0 mol/L cobalt nitrate aqueous solution with distilled water to 100 mL was added to the aqueous solution, followed by stirring at 80° C. for 30 minutes. After stirring, the resulting precipitate was aspirated and filtered and then washed with water at 80° C., followed by drying in the atmosphere at 100° C. for 24 hours. Thus, a precursor was obtained. The obtained precursor was mixed in an automatic mortar for 24 hours and then subjected to calcination in the atmosphere at 750° C. for 24 hours. Thus, a magnesium composite oxide was obtained. The rate of temperature increase during the calcination was set to 5° C./minute.

The crystal structure of the obtained magnesium composite oxide was analyzed by a powder X-ray diffractometer (X'PERT PRO manufactured by PANalytical). As a result, it was observed that all diffraction peaks were attributed to the rock salt-type crystal structure of space group Fm-3m, indicating that a single phase was obtained. FIG. 1 shows the powder X-ray diffraction pattern of the magnesium composite oxide obtained in Synthesis Example 1.

In addition, the chemical composition of the obtained magnesium composite oxide was analyzed by an inductively coupled plasma emission spectrometer (ICPE-9000 manufactured by Shimadzu Corporation). Further, the crystal structure thereof was analyzed by a radiation X-ray diffractometer (BL02B2, SPring-8), and crystallographic characteristics thereof were examined by Rietveld analysis based on the obtained diffraction pattern. For the Rietveld analysis, the Rietveld analysis software "RIETAN-FP" was used. Table 1 below lists crystal structure parameters.

TABLE 1

Space group: Fm-3m, $R_{wp}$ = 1.62%, $R_p$ = 1.20%, $R_e$ = 1.98%
S = 0.820, a = 0.419578(2) nm

| Atom | Site | g | x | y | z | B (Å$^2$) |
|---|---|---|---|---|---|---|
| Mg | 4a | 0.2235 (2) | 0 | 0 | 0 | 0.183 (5) |
| Ni | 4a | 0.6148 | =Mg (x) | =Mg (y) | =Mg (z) | =Mg (B) |
| Co | 4a | 0.1229 | =Mg (x) | =Mg (y) | =Mg (z) | =Mg (B) |
| O | 4b | 1 | ½ | ½ | ½ | 0.374 (6) |

As a result of the Rietveld analysis, the empirical formula was found to be $Mg_{0.447}Ni_{1.229}Co_{0.246}O_2$ having voids in the metal site.

Synthesis Example 2

1.48 g of sodium carbonate was dissolved in 200 mL of secondary distilled water, and the resulting aqueous solution was heated to 80° C. A solution prepared by diluting 16.00 mL of a 1.0 mol/L magnesium nitrate aqueous solution, 6.40 mL of a 1.0 mol/L nickel nitrate aqueous solution, and 1.60 mL of a 1.0 mol/L cobalt nitrate aqueous solution with distilled water to 100 mL was added to the aqueous solution, followed by stirring at 80° C. for 30 minutes. After stirring, the resulting precipitate was aspirated and filtered and then washed with water at 80° C., followed by drying in the atmosphere at 100° C. for 24 hours. Thus, a precursor was obtained. The obtained precursor was mixed in an automatic mortar for 24 hours and then subjected to calcination in the atmosphere at 750° C. for 24 hours. Thus, a magnesium composite oxide was obtained. The rate of temperature increase during the calcination was set to 5° C./minute.

The crystal structure of the obtained magnesium composite oxide was analyzed by a powder X-ray diffractometer (X'PERT PRO manufactured by PANalytical). As a result, it was observed that all diffraction peaks were attributed to the rock salt-type crystal structure of space group Fm-3m, indicating that a single phase was obtained.

In addition, the chemical composition of the obtained magnesium composite oxide was analyzed by an inductively coupled plasma emission spectrometer (ICPE-9000 manufactured by Shimadzu Corporation). Further, the crystal structure thereof was analyzed by a radiation X-ray diffractometer (BL02B2, SPring-8), and crystallographic characteristics thereof were examined by Rietveld analysis based on the obtained diffraction pattern in the same manner as in Synthesis Example 1. Table 2 below lists crystal structure parameters.

TABLE 2

Space group: Fm-3m, $R_{wp}$ = 2.72%, $R_p$ = 2.06%, $R_e$ = 2.99%
S = 0.91, a = 0.419719(1) nm

| Atom | Site | g | x | y | z | B (Å$^2$) |
|---|---|---|---|---|---|---|
| Mg | 4a | 0.3194 (5) | 0 | 0 | 0 | 0.170 (2) |
| Ni | 4a | 0.5093 | =Mg (x) | =Mg (y) | =Mg (z) | =Mg (B) |
| Co | 4a | 0.1281 | =Mg (x) | =Mg (y) | =Mg (z) | =Mg (B) |
| O | 4b | 1 | ½ | ½ | ½ | 0.375 (8) |

As a result of the Rietveld analysis, the empirical formula was found to be $Mg_{0.639}Ni_{1.018}Co_{0.256}O_2$ having voids in the metal site.

Synthesis Example 3

1.48 g of sodium carbonate was dissolved in 200 mL of secondary distilled water, and the resulting aqueous solution was heated to 80° C. A 1.0 mol/L magnesium nitrate aqueous solution, a 1.0 mol/L nickel nitrate aqueous solution, and a 1.0 mol/L cobalt nitrate aqueous solution were mixed at a predetermined ratio, and a solution prepared by diluting the mixture with distilled water to 100 mL was added to the aqueous solution, followed by stirring at 80° C. for 30 minutes. After stirring, the resulting precipitate was aspirated and filtered and then washed with water at 80° C., followed by drying in the atmosphere at 100° C. for 24 hours. Thus, a precursor was obtained. The obtained precursor was mixed in an automatic mortar for 24 hours and then subjected to calcination in the atmosphere at 750° C. for 24 hours. Thus, a magnesium composite oxide was obtained. The rate of temperature increase during the calcination was set to 5° C./minute.

The crystal structure of the obtained magnesium composite oxide was analyzed by a powder X-ray diffractometer (X'PERT PRO manufactured by PANalytical). As a result, it was observed that all diffraction peaks were attributed to the rock salt-type crystal structure of space group Fm-3m, indicating that a single phase was obtained.

In addition, the chemical composition of the obtained magnesium composite oxide was analyzed by an inductively coupled plasma emission spectrometer (ICPE-9000 manufactured by Shimadzu Corporation). Further, the crystal structure thereof was analyzed by a radiation X-ray diffractometer (BL02B2, SPring-8), and crystallographic characteristics thereof were examined by Rietveld analysis based on the obtained diffraction pattern in the same manner as in Synthesis Example 1. Table 3 below lists crystal structure parameters.

TABLE 3

Space group: Fm-3m, $R_{wp}$ = 2.86%, $R_p$ = 2.09%, $R_e$ = 2.14%
S = 1.33, a = 0.419572(1) nm

| Atom | Site | g | x | y | z | B (Å$^2$) |
|---|---|---|---|---|---|---|
| Mg | 4a | 0.02298 (3) | 0 | 0 | 0 | 0.204 |
| Ni | 4a | 0.7586 | =Mg (x) | =Mg (y) | =Mg (z) | =Mg (B) |
| Co | 4a | 0.1828 | =Mg (x) | =Mg (y) | =Mg (z) | =Mg (B) |
| O | 4b | 1 | ½ | ½ | ½ | 0.392 (8) |

As a result of the Rietveld analysis, the empirical formula was found to be $Mg_{0.046}Ni_{1.517}Co_{0.366}O_2$ having voids in the metal site.

Comparative Synthesis Example 1

1.48 g of sodium carbonate was dissolved in 200 mL of secondary distilled water, and the resulting aqueous solution was heated to 80° C. A solution prepared by diluting 8.00 mL of a 1.0 mol/L magnesium nitrate aqueous solution and 8.00 mL of a 1.0 mol/L nickel nitrate aqueous solution with distilled water to 100 mL was added to the aqueous solution, followed by stirring at 70° C. for 30 minutes. After stirring, the resulting precipitate was aspirated and filtered, followed by drying in the atmosphere at 100° C. for 24 hours. Thus, a precursor was obtained. The obtained precursor was mixed in an automatic mortar for 24 hours and then subjected to calcination in the atmosphere at 950° C. for 24 hours. Thus, a magnesium composite oxide was obtained. The rate of temperature increase during the calcination was set to 5° C./minute.

The crystal structure of the obtained magnesium composite oxide was analyzed by a powder X-ray diffractometer (X'PERT PRO manufactured by PANalytical). As a result, it was observed that all diffraction peaks were attributed to the rock salt-type crystal structure of space group Fm-3m, indicating that a single phase was obtained.

In addition, the chemical composition of the obtained magnesium composite oxide was analyzed by an inductively coupled plasma emission spectrometer (ICPE-9000 manufactured by Shimadzu Corporation). Further, the crystal structure thereof was analyzed by a radiation X-ray diffractometer (BL02B2, SPring-8), and crystallographic characteristics thereof were examined by Rietveld analysis based on the obtained diffraction pattern in the same manner as in Synthesis Example 1. As a result of the Rietveld analysis, the empirical formula was found to be $Mg_{0.468}Ni_{1.532}O_2$ having voids in the metal site.

Example 1

(Preparation of Magnesium Secondary Battery)

The magnesium composite oxide (positive electrode active material) obtained in Synthesis Example 2 in an amount of 50 parts by mass, 10 parts by mass of polytetrafluoroethylene (binder), and 50 parts by mass of carbon black (conductive auxiliary agent SUPER C65 manufactured by Timcal) were mixed, thereby preparing a positive electrode mixture film by a dry method. This positive electrode mixture film was pressure-bonded to an aluminum mesh with a diameter of 15 mm (current collector, 100 meshes) and dried at 110° C. Thus, a positive electrode was prepared.

Further, a metal magnesium plate (manufactured by the Nilaco Corporation, purity of 99.9% by mass, thickness of 0.10 mm) was punched to form a circle with a diameter of 15 mm. Thus, a negative electrode was prepared.

Glass paper (TGP-008F manufactured by Nippon Sheet Glass Co., Ltd.) was prepared as a separator.

A non-aqueous electrolyte solution was prepared by dissolving $Mg(N(SO_2CF_3)_2)_2$ serving as a supporting salt in acetonitrile such that the concentration was adjusted to 0.5 mol/L. Then, the positive electrode and the separator were impregnated with the non-aqueous electrolyte solution.

Thereafter, the positive electrode, the separator, and the negative electrode were layered in that order in a stainless cell (HS FLAT CELL manufactured by Hohsen Corp.), thereby producing a magnesium secondary battery.

(Evaluation)

The produced magnesium secondary battery was examined by a charge-discharge test in a thermostatic chamber at 60° C. Specifically, the magnesium secondary battery was discharged at a current density of 5 mA/g, and when the potential reached 0 V (vs. $Mg/Mg^{2+}$), the mode was switched to charging and the magnesium secondary battery was continuously charged at a current density of 5 mA/g.

Figure 2:
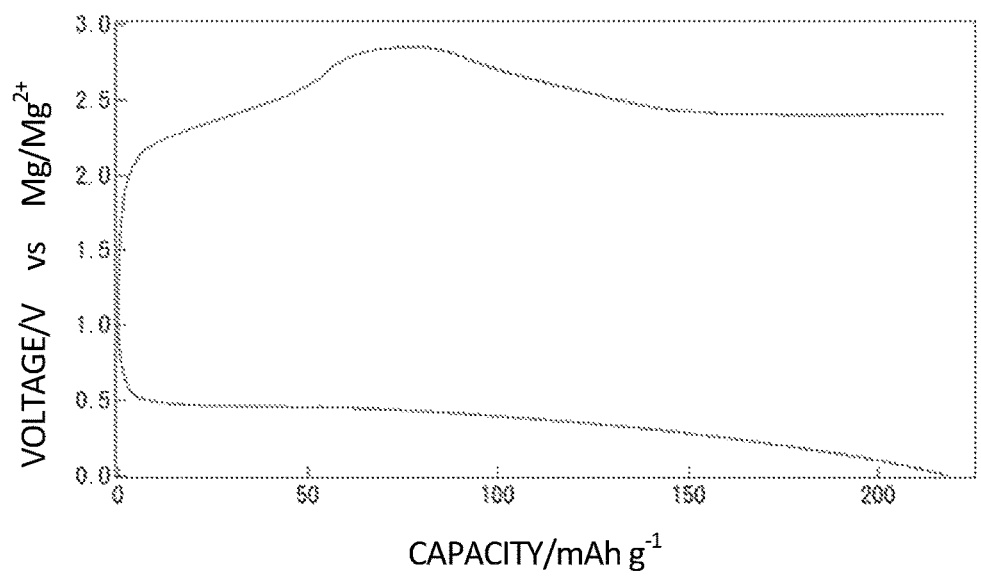
FIG. 2 is a drawing showing the first discharge/charge curve of the magnesium secondary battery in Example 1.

FIG. 2 shows the first discharge/charge curve of the magnesium secondary battery of Example 1. As is understood from FIG. 2, the magnesium secondary battery of Example 1 exhibited the initial discharge capacity exceeding 200 mAh/g.

Example 2

(Preparation of Magnesium Secondary Battery)

A magnesium secondary battery was produced in the same manner as in Example 1 except that the magnesium composite oxide obtained in Synthesis Example 3 was used instead of the magnesium composite oxide obtained in Synthesis Example 2.

(Evaluation)

The produced magnesium secondary battery was examined by a charge-discharge test in a thermostatic chamber at 60° C. Specifically, the magnesium secondary battery was discharged at a current density of 5 mA/g, and when the potential reached 0 V (vs. $Mg/Mg^{2+}$), the mode was switched to charging and the magnesium secondary battery was continuously charged at a current density of 5 mA/g until the potential reached 3 V (vs. $Mg/Mg^{2+}$).

Figure 3:
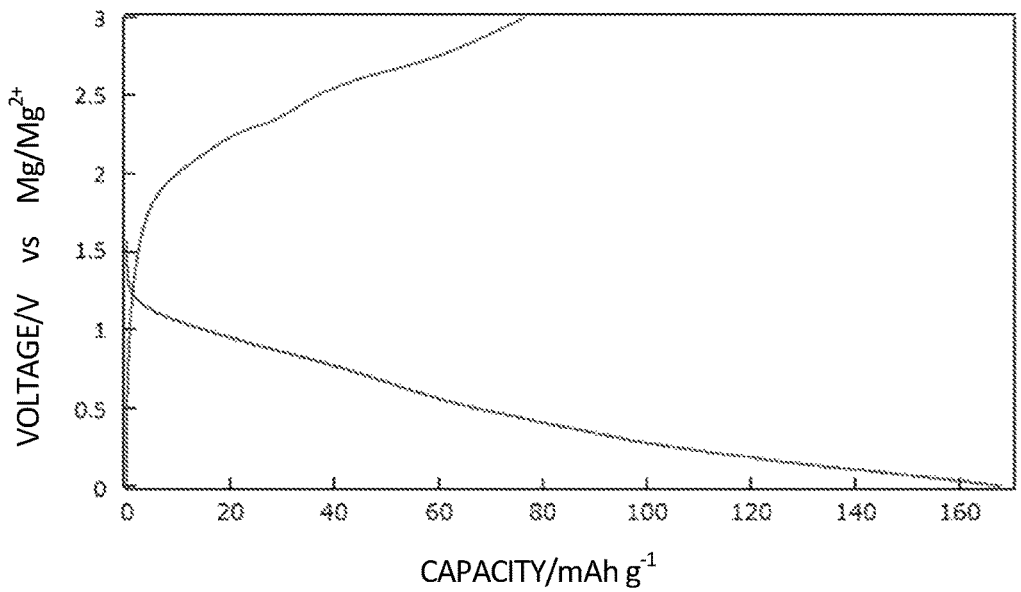
FIG. 3 is a drawing showing the first discharge/charge curve of the magnesium secondary battery in Example 2.

FIG. 3 shows the first discharge/charge curve of the magnesium secondary battery of Example 2. As is understood from FIG. 3, the magnesium secondary battery of Example 2 exhibited the initial discharge capacity exceeding 160 mAh/g.

Further, with respect to the positive electrode before charging/discharging and the positive electrode after charging and discharging was repeated for 50 cycles, the composition of magnesium in the positive electrode mixture layer was analyzed by an inductively coupled plasma emission spectrometer (ICPE-9000 manufactured by Shimadzu Corporation). As a result, the magnesium composition before charging/discharging was 0.0294 pfu, while on the other hand, the magnesium composition was 0.279 pfu after charging and discharging was repeated for 50 cycles, suggesting that magnesium was inserted into the magnesium composite oxide structure.

Comparative Example 1

(Preparation of Magnesium Secondary Battery)

A magnesium secondary battery was produced in the same manner as in Example 1 except that the magnesium composite oxide obtained in Comparative Synthesis Example 1 was used instead of the magnesium composite oxide obtained in Synthesis Example 2.

(Evaluation)

The produced magnesium secondary battery was examined by a charge-discharge test in a thermostatic chamber at 60° C. Specifically, the magnesium secondary battery was charged at a current density of 5 mA/g, and when the potential reached 3 V (vs. $Mg/Mg^{2+}$), the mode was switched to discharging and the magnesium secondary battery was continuously discharged at a current density of 5 mA/g until the potential reached 0 V (vs. $Mg/Mg^{2+}$).

Figure 4:
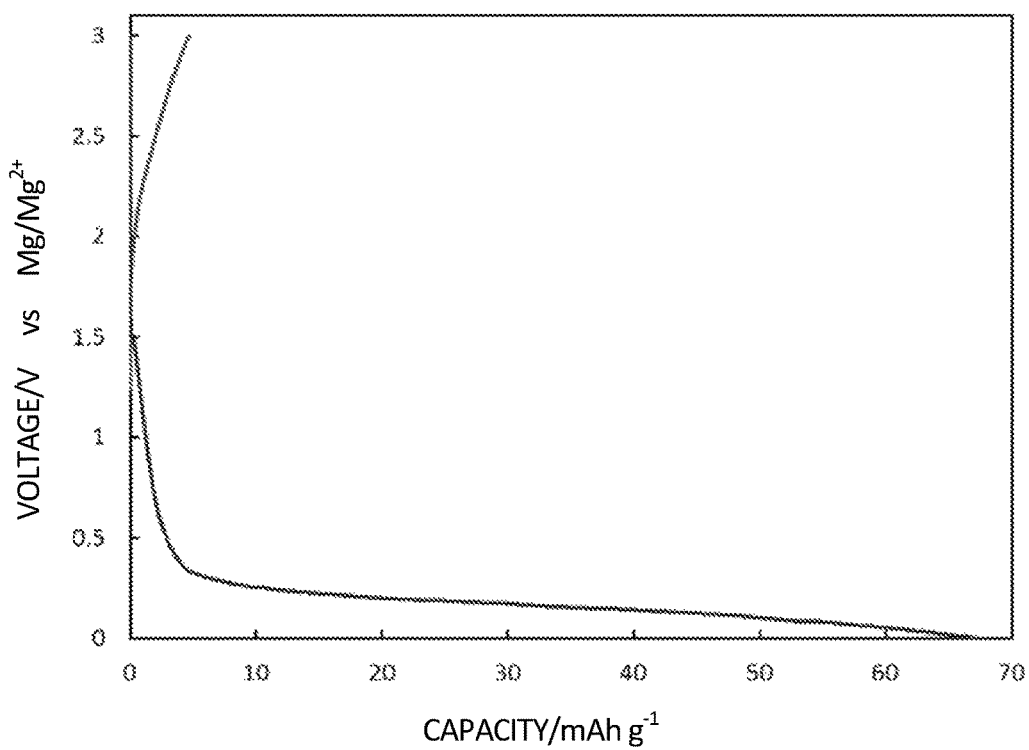
FIG. 4 is a drawing showing the first discharge/charge curve of the magnesium secondary battery in Comparative Example 1.

FIG. 4 shows the first discharge/charge curve of the magnesium secondary battery of Comparative Example 1. As is understood from FIG. 4, the magnesium secondary battery of Comparative Example 1 exhibited the initial discharge capacity below 70 mAh/g.

The disclosure of Japanese Patent Application No. 2015-117810, filed on Jun. 10, 2015, is incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive electrode active material for a magnesium secondary battery, the positive electrode active material consisting of a magnesium composite oxide that is represented by the following Formula (1) and that has a rock salt-type crystal structure of space group Fm-3m:

$$Mg_xM1_yM2_zO_2 \qquad (1)$$

wherein, in Formula (1), M1 is Ni, Co, or Mn;
M2 is different from M1 and is at least one element selected from the group consisting of Ni, Co, Mn, Ti, V, Cr, Fe, Cu, Nb, W, Mo, and Ru;
$0<x\leq1$;
$0<y<2$;
$0<z<1$; and
$1.5\leq x+y+z\leq2.0$.

2. The positive electrode active material for a magnesium secondary battery according to claim 1, wherein M1 in Formula (1) is Ni.

3. The positive electrode active material for a magnesium secondary battery according to claim 1, wherein M2 in Formula (1) is at least one element selected from the group consisting of Ni, Co, Mn, Ti, V, Cr, Fe, and Cu.

4. The positive electrode active material for a magnesium secondary battery according to claim 1, wherein $0<x\leq0.8$, $0.5\leq y<2$, $0<z\leq0.6$, and $1.5\leq x+y+z\leq2.0$.

5. A positive electrode for a magnesium secondary battery, the positive electrode comprising the positive electrode active material for a magnesium secondary battery according to claim 1.

6. A magnesium secondary battery, comprising:
the positive electrode for a magnesium secondary battery according to claim 5;
a negative electrode; and
a non-aqueous electrolyte solution.

7. The positive electrode active material for a magnesium secondary battery according to claim 1, wherein in Formula (1):
M1 is Ni; and
M2 is at least one element selected from the group consisting of Ni, Co, Mn, Ti, V, Cr, Fe, and Cu.

8. The positive electrode active material for a magnesium secondary battery according to claim 1, wherein in Formula (1):
M1 is Ni;
M2 is at least one element selected from the group consisting of Ni, Co, Mn, Ti, V, Cr, Fe, and Cu;
$0<x\leq0.8$;
$0.5\leq y<2$;
$0<z\leq0.6$; and
$1.5\leq x+y+z\leq2.0$.

9. The positive electrode for a magnesium secondary battery according to claim 5, wherein in Formula (1):
M1 is Ni; and
M2 is at least one element selected from the group consisting of Ni, Co, Mn, Ti, V, Cr, Fe, and Cu.

10. The positive electrode for a magnesium secondary battery according to claim 5, wherein in Formula (1):
M1 is Ni;
M2 is at least one element selected from the group consisting of Ni, Co, Mn, Ti, V, Cr, Fe, and Cu;
$0<x\leq0.8$;
$0.5\leq y<2$;
$0<z\leq0.6$; and
$1.5\leq x+y+z\leq2.0$.

11. The magnesium secondary battery according to claim 6, wherein in Formula (1):
M1 is Ni; and
M2 is at least one element selected from the group consisting of Ni, Co, Mn, Ti, V, Cr, Fe, and Cu.

12. The magnesium secondary battery according to claim 6, wherein in Formula (1):
M1 is Ni;
M2 is at least one element selected from the group consisting of Ni, Co, Mn, Ti, V, Cr, Fe, and Cu;
$0<x\leq0.8$;
$0.5\leq y<2$;
$0<z\leq0.6$; and
$1.5\leq x+y+z\leq2.0$.

* * * * *